July 21, 1953
HIROSHI ITO
2,645,974
HIGH APERTURE WIDE ANGLE SIX ELEMENT
GAUSS TYPE OBJECTIVE LENS SYSTEM
Filed June 29, 1951
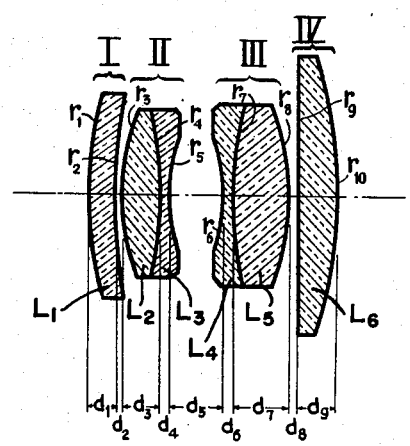
FIG. 1
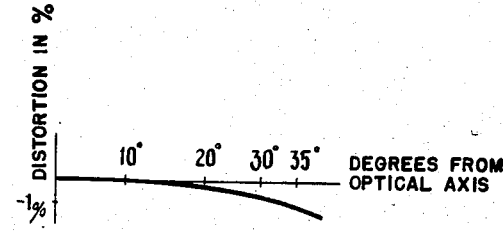
FIG. 2
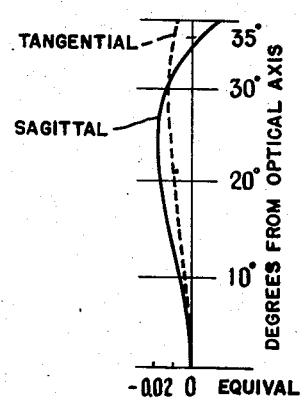
FIG. 3
FIG. 4
INVENTOR
HIROSHI ITO
BY
HIS ATTORNEY

UNITED STATES PATENT OFFICE 2,645,974

HIGH APERTURE WIDE ANGLE SIX ELEMENT GAUSS TYPE OBJECTIVE LENS SYSTEM

Hiroshi Ito, Setagaya-ku, Tokyo, Japan, assignor to Canon Camera Company, Ltd., Chuouku, Tokyo, Japan, a corporation of Japan Application June 29, 1951, Serial No. 234,355
In Japan January 31, 1951

5 Claims. (Cl. 88—57)

The present invention relates to an improved photographic objective of the Gauss type composed of six glasses which commonly known as a high aperture lens.

The object of the present invention is to make such a lens of Gauss type with high aperture and wide including field with an including field of, or in excess of, 75 degrees and an F':3.5 aperture, that is, higher than prior known objectives of such type.

Previously the including field of any objective of Gauss-type seldom exceeded about 60°, but recent studies have succeeded in improving the said lens system so that it may include the field of view of more than 60°. The present inventor is one of those inventors who have contributed towards the said improvement when he made a certain invention in this field, which was subsequently filed on June 29, 1951, as U. S. application for Ser. No. 234,356 which is copending. In the instant application, the inventor has succeeded in making a lens having a substantially increased wide angle by developing the idea set forth in the specification of the said application.

The present invention will be readily understood from the following description of an illustrative embodiment taken in conjunction with the appended drawing in which:

Figure 1 is an axial section through the lens system of the objective of the instant invention, Figure 2 discloses the sine condition, respectively, spherical aberration, graphs of the instant objective plotted, the former in dashed lines and the latter in the full line, on equivalent focal lengths as the horizontal axis and the relative apertures as the vertical axis;

Figure 3 discloses the astigmatism graphs for tangential and sagittal focal points thereof, the former in dashed lines and the latter in the full line, on equivalent focal lengths as the horizontal axis and on degrees from the optical axis as the vertical axis, and Figure 4 is the graph of the distortion thereof with angles plotted horizontally and percentage distortion plotted vertically.

Referring to Figure 1, my instant objective is of the Gauss type and comprises four lens units, I, II, III and IV, separated from each other by air spaces of the axial values $d_2$, $d_5$ and $d_8$ respectively. Unit I is a single positive lens $L_1$, unit II is a compound meniscus lens consisting of the two lenses $L_2$ and $L_3$ cemented to each other along adjacent faces of identical radius $r_4$, unit III a compound meniscus lens consisting of the two lenses $L_4$ and $L_5$ cemented to each other along adjacent faces of identical radius $r_7$, while unit IV is a single positive lens $L_6$, the exterior concave surfaces of units II and III facing each other. In Figure 1, the successive lens surfaces radii are indicated by $r_{subscript}$, with the subscripts increasing numerically from the front of the objective to the rear thereof, while axial distances between successive lens surfaces are indicated by $d_{subscript}$, the subscripts similarly increasing numerically.

In the present invention, the radius of curvature of the convex face ($r_3$) and the concave face ($r_5$) in touch with air of the cemented lens of meniscus style forming No. II component of my objective are respectively, from 0.55 to 0.40 fold and from 0.38 to 0.25 fold of the focal length, while the thickness ($d_3+d_4$) of the said cemented lens is thinner than that ($d_6+d_7$) of the cemented lens of meniscus style forming the No. III component. As an example, the thickness ($d_3+d_4$) and that ($d_6+d_7$) is respectively from 0.1 to 0.13 fold and from 0.13 to 0.15 fold the focal length. Thus, the Petzval sum of this lens system shall remain at around 0.4, and so various aberrations can be removed adequately for the entire including field of more than 75°. Especially as the refractive power ($\varphi_1$) of each component single lens of this lens system is fairly small, the spherical aberration and coma are removed with ease and the aperture can be heightened to F':3.5, by far a higher aperture than that of prior known similar lens systems.

The constructional data of the illustrative embodiment of the present invention shown in Figure 1 are as follows:

[NOTE.—Focal length=1.00; including field=75°; aperture=F': 3.5]

| | | r | d | L | $n_D$ | V |
|---|---|---|---|---|---|---|
| I | | $r_1$ = 0.603 | $d_1$=0.068 | $L_1$ | 1.5638 | 60.7 |
| | | $r_2$ = 2.595 | $d_2$=0.005 | | | |
| II | | $r_3$ = 0.472 | $d_3$=0.098 | $L_2$ | 1.6237 | 47.0 |
| | | $r_4$ =−3.000 | $d_4$=0.024 | $L_3$ | 1.5955 | 39.2 |
| | | $r_5$ = 0.323 | $d_5$=0.100 | | | |
| III | | $r_6$ =−0.331 | $d_6$=0.017 | $L_4$ | 1.5785 | 41.7 |
| | | $r_7$ = 0.798 | $d_7$=0.124 | $L_5$ | 1.6204 | 60.3 |
| | | $r_8$ =−0.428 | $d_8$=0.004 | | | |
| IV | | $r_9$ = ∞ | $d_9$=0.090 | $L_6$ | 1.6204 | 60.3 |
| | | $r_{10}$=−0.866 | | | | | where $n_D$ are the respective indices of refraction and V the respective Abbé numbers, and a minus sign before a radius indicates a curvature concave to the front, that is object side, of the objective.

As is clear from Fig. 2 to Fig. 4, under the said conditions there will be made an excellent high aperture wide angle lens whose various aberrations are quite insignificant. Further, as the result of trigonometrical calculus, it has been established that the oblique spherical aberration, or coma will not exceed one-800th of the focal length throughout the picture area even when ample light is admitted to come into the edge portion of the picture.

I claim:

1. A coma corrected objective lens system having an including field of at least 75 degrees and an aperture of F:3.5 comprising four lens units consisting of two compound meniscus lenses having their exterior concave surfaces facing each other, and two simple collective lenses between which the two compound lenses are positioned in axial alignment and spaced from each other and each collective lens, the object-side meniscus compound lens having a front convex surface of which the radius of curvature is in the range from 0.55 to 0.40 times the total focal length of the objective and a rear concave surface of which the radius of curvature is in the range from 0.38 to 0.25 times the total focal length, and the axial thickness of the object-side compound lens is less than the axial thickness of the image-side compound meniscus lens.

2. An objective according to claim 1 in which the object-side compound meniscus lens consists of a convex and a concave lens component of which the adjacent surfaces are cemented to each other and of a curvature concave to the object side of the objective, and the image-side compound meniscus lens consists of a convex and a concave lens component of which the adjacent surfaces are cemented to each other and of a curvature convex to the object side of the objective.

3. An objective according to claim 1 in which the axial thickness of the object-side compound meniscus lens is in the range from 0.1 to 0.13 times the total focal length of the objective and the axial thickness of the image-side compound meniscus lens is in the range from 0.13 to 0.15 times the total focal length.

4. A coma corrected objective lens system having an including field of at least 75 degrees and an aperture of at least F:3.5 consisting of six axially aligned lens elements, the six lens elements constituting an object-side converging lens, an image-side converging lens, an object-side compound meniscus lens and an image-side compound meniscus lens spaced from each other, each compound meniscus lens having a cemented interface, the interface of the object-side compound meniscus lens is of a curvature concave to the object side of the objective, the interface of the image-side compound meniscus lens is of a curvature convex to the object side of the objective, the axial thickness of the object-side compound meniscus lens is in the range of from 0.1 to 0.13 times the total focal length of the objective, the axial thickness of the image-side compound meniscus lens being greater and in the range of from 0.13 to 0.15 times the total focal length of the objective, the front surface of the object-side compound meniscus lens having a curvature convex to the object side of the objective and of a radius 0.55 to 0.40 times the total focal length of the objective, and the rear surface of the object-side compound meniscus lens has a curvature concave to the object side of the objective and of a radius 0.38 to 0.25 times the total focal length.

5. A coma corrected objective lens system consisting of six axially aligned lens elements arranged to comprise two cemented compound meniscus lens units positioned between two convergent simple lens units, having the following constructional data, in which $r$ is the radius of curvature of the lens surface, $d$ the axial distance from lens surface to lens surface, the increasing subscripts for each $r$ and $d$ indicating the succession thereof from the object to the image side of the objective, $n_D$ the index of refraction of the lens glass and V the Abbé number thereof:

[Focal length = 1.00; including field 75 degrees; aperture F:3.5]

| $r$ | $d$ | $n_D$ | V |
| --- | --- | --- | --- |
| $r_1 = 0.603$ | $d_1 = 0.068$ | 1.5638 | 60.7 |
| $r_2 = 2.595$ | $d_2 = 0.005$ | | |
| $r_3 = 0.472$ | $d_3 = 0.098$ | 1.6237 | 47.0 |
| $r_4 = -3.000$ | $d_4 = 0.024$ | 1.5955 | 39.2 |
| $r_5 = 0.323$ | $d_5 = 0.100$ | | |
| $r_6 = -0.331$ | $d_6 = 0.017$ | 1.5785 | 41.7 |
| $r_7 = 0.798$ | $d_7 = 0.124$ | 1.6204 | 60.3 |
| $r_8 = -0.428$ | $d_8 = 0.004$ | | |
| $r_9 = \infty$ | $d_9 = 0.090$ | 1.6204 | 60.3 |
| $r_{10} = -0.866$ | | | |

HIROSHI ITO.

References Cited in the file of this patent

UNITED STATES PATENTS

| Number | Name | Date |
| --- | --- | --- |
| 583,336 | Rudolph | May 25, 1897 |
| 2,349,893 | Warmisham et al. | May 30, 1944 |
| 2,391,209 | Warmisham | Dec. 18, 1945 |
| 2,475,938 | Altman | July 12, 1949 |

FOREIGN PATENTS

| Number | Country | Date |
| --- | --- | --- |
| 323,138 | Great Britain | Dec. 24, 1929 |
| 423,468 | Great Britain | Feb. 1, 1935 |
| 547,666 | Great Britain | Sept. 7, 1942 |